UNITED STATES PATENT OFFICE.

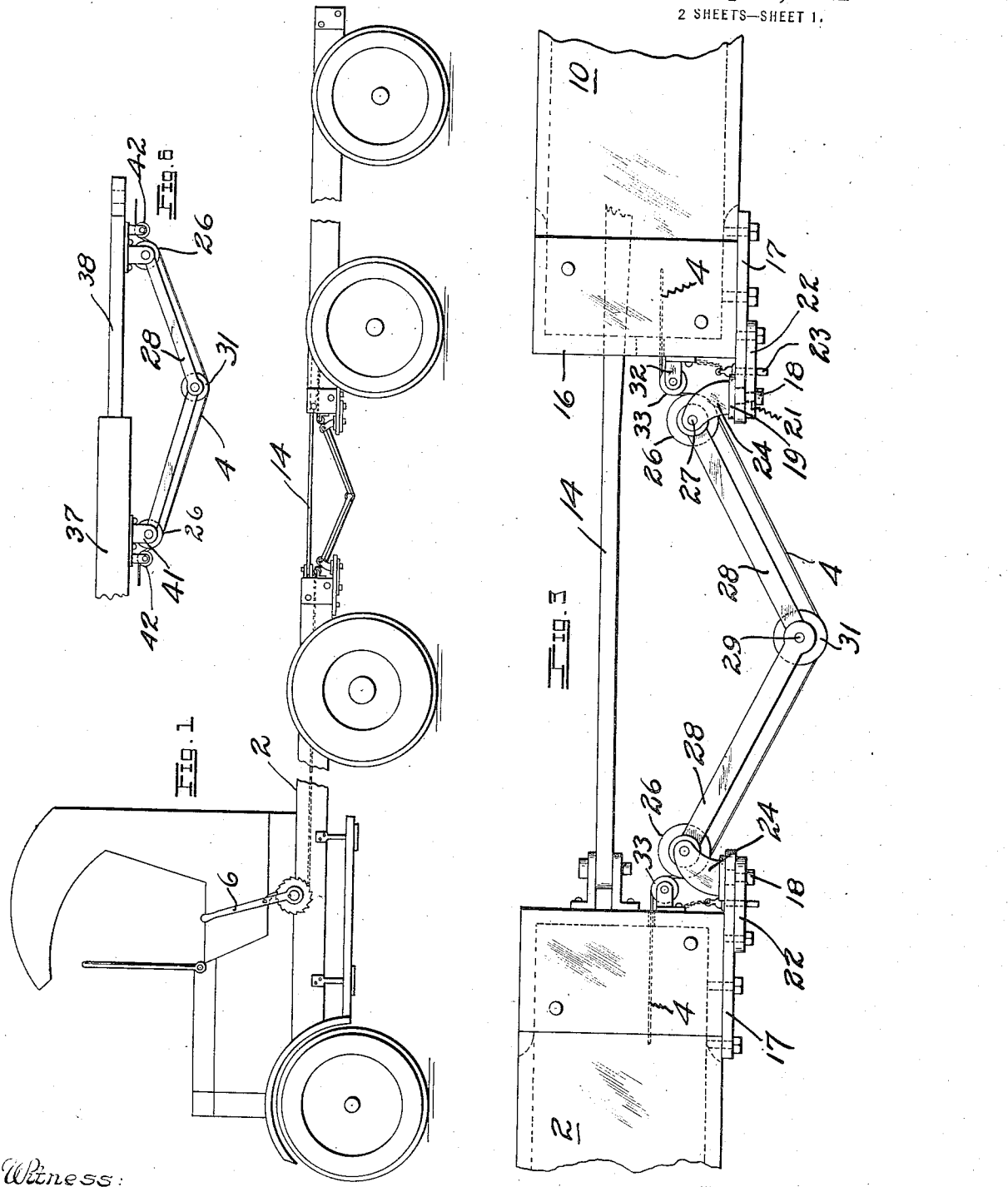

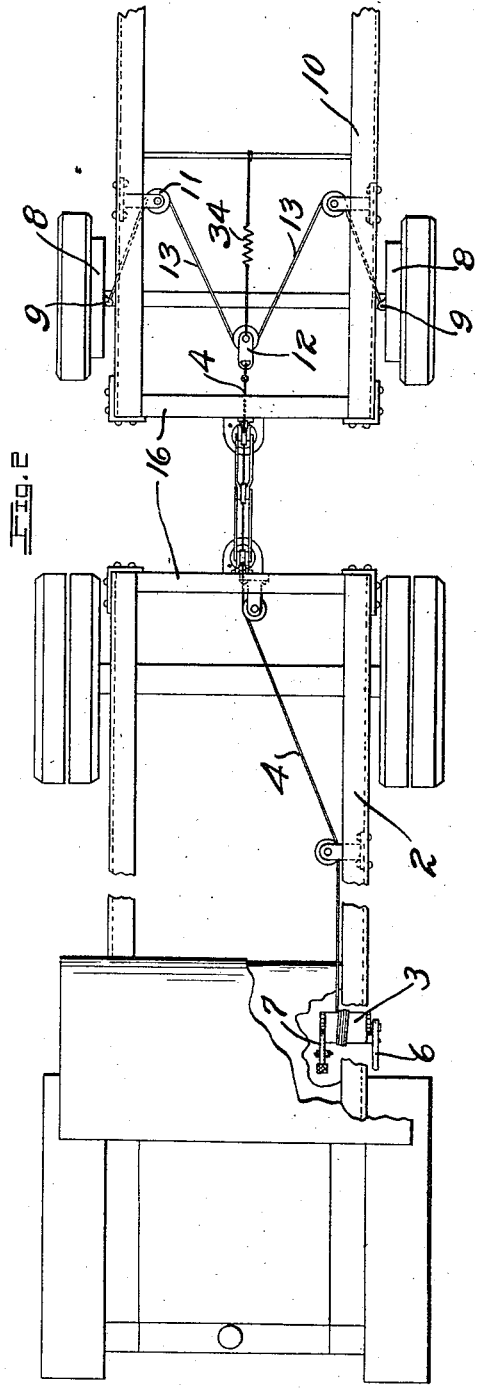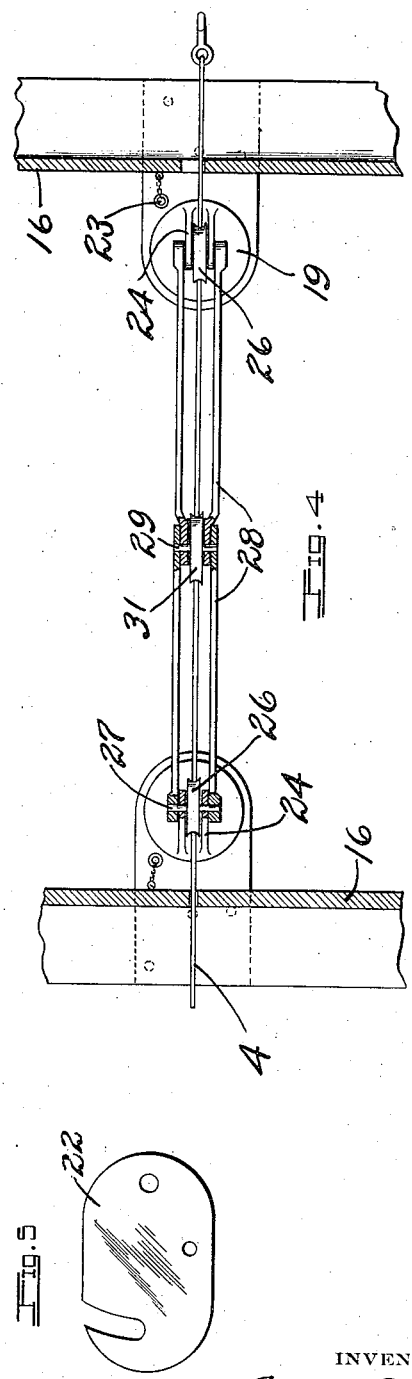

GEORGE S. LANE, OF SAN FRANCISCO, CALIFORNIA, ASSIGNOR, BY MESNE ASSIGNMENTS, TO THE WESTINGHOUSE AIR BRAKE COMPANY, OF WILMERDING, PENNSYLVANIA, A CORPORATION OF PENNSYLVANIA.

TRAILER-BRAKE-CONTROLLING DEVICE.

1,412,009.  Specification of Letters Patent.  Patented Apr. 4, 1922.

Application filed May 26, 1920. Serial No. 384,434.

*To all whom it may concern:*

Be it known that I, GEORGE S. LANE, a citizen of the United States, and a resident of the city and county of San Francisco and State of California, have invented a new and useful Trailer-Brake-Controlling Device, of which the following is a specification.

My invention relates to brake controlling means.

With the growth of motor transportation and the increasing use of trailers, it has become necessary to equip such trailers with brakes, and to place within the driver's control means for operating them. Since the trailer is customarily coupled to the truck by means which permit a small variation in distance between them, and since in rounding curves, the relative positions of the truck and trailer vary widely, such brake controlling apparatus must be designed to give instant and effective control despite the varying relative positions of the two vehicles. It is therefore one of the objects of my invention to provide mechanical means for controlling the brakes of a trailer operable from the driver's seat, and which is unaffected by movement of the trailer relative to the truck.

Figure 1 is an elevation of a truck and trailer showing the application of my brake controlling apparatus.

Figure 2 is a plan view of the same.

Figure 3 is an elevation of a portion of the device, drawn on a larger scale.

Figure 4 is a plan view of the portion shown in Figure 3.

Figure 5 is a bottom view of a portion of the mechanism shown in Figure 3.

Figure 6 is an elevation of a portion of a modified form of my invention.

In terms of broad inclusion my invention comprises a windlass arranged on the truck with operating lever and pawl convenient for operation by the driver, brakes on the trailer connected by cable to the windlass, and means interposed between the two vehicles for maintaining the cable taut irrespective of the relative motion between them.

Mounted on the truck frame 2 is a windlass comprising a drum 3 about which the cable 4 is wound. The windlass is operated by the hand lever 6, and a pawl 7, operated by the foot of the driver, is provided for controlling the winding movement of the drum. Within the brake drums 8 on the trailer wheels are brake shoes of known type operated by levers 9. Pivotally arranged adjacent each side of the trailer frame 10 is a pulley 11. A single sheave block 12 is hooked to the trailer end of the cable 4. A cable 13 is then passed through block 12, then through pulleys 11, and the ends secured to the levers 9 as best shown in Figure 2.

The trailer is coupled to the truck or tractor by a coupling bar 14 shown in Figure 1 and Figure 6 but omitted in Figure 2 for the sake of clarity. Coupler bars are usually telescopic, with a spring interposed between the telescoping parts 37 and 38 to relieve the tractor and trailer of abrupt shocks and are usually connected to the steering mechanism of the front wheels of the trailer and are detachably, pivotally connected to the rear end of the tractor. These extensible coupler bars permit the distance between the tractor and trailer to vary and in making turns, permit the vehicles to assume different relative positions so that if the cable 4 passed directly from the block 12 to the windlass drum, the cable might be slacked at the moment power was applied thereto to set the brakes, and this slack would have to be taken up before movement of the lever 6 would affect the brakes. If the cable were taut when the trailer was close to the truck, a separating movement would throw an undue strain upon the cable.

It is therefore necessary to provide means for keeping the cable 4 taut irrespective of the changes in the relative positions of or distance between the two vehicles, so that movement of the drum is immediately effective upon the brakes. This is accomplished in the present embodiment of my invention, by means of a series of spaced guides or pulleys spanning the variable distance between the vehicles, and over which the cable is threaded. The mounting of the guide pulleys is such that the sum of the distances separating them is a constant, so that irrespective of the relative movements of the vehicles, the same length of cable is required to thread over the pulleys between the brakes and the windlass.

On the lower side of the end frame member 16 of both the truck and the trailer is a bracket 17 in which is pivotally mounted a stud 18 provided with a flange 19 adapted to seat upon the bracket 17. The stud is formed with an annular channel 21 adapted to be engaged by the slotted latch 22 pivoted on the under side of the bracket 17, to prevent the withdrawal of the stud from its bearing. A locking pin 23 retains the latch in engagement with the stud. Removal of the locking pin permits the latch to be swung to one side out of engagement with the stud which can then be lifted out of its bearing. Fixed on the flange 19 are curved arms 24 between which a pulley 26 is mounted on pin 27. Pivotally mounted on the same pin are links 28 somewhat longer than half of the contemplated maximum distance between the two vehicles and these links from each pivoted stud 18 are pivotally connected by a pin 29 upon which is also mounted the pulley 31 between the links.

On the end frame member of each vehicle above the pivoted stud 18, is fixed a bracket 32 in which a pulley 33 is mounted. The cable 4 is passed over pulleys 33 and under pulleys 26 and pulley 29. The size and proportion of parts and the curvature of the arms 24 are such that the axis of that portion of the cable lying between pulleys 33 and 26 is coincident with the pivoted axis of the stud 18; that is to say, the periphery of the pulley 33 is tangent to the pivotal axis of the stud, so that turning of the stud when the truck train is rounding a curve does not carry the cable out of proper alinement with either pulley.

From the above it will be clear that variation in the distance between the vehicles merely closes or opens the angle between the links pivoted on the central pin 29 and that the distance from the axis of pin 29 to the axis of each pin 27 is unchanged, and hence the length of cable passing over the pulleys on the pins is unchanged. The pivotal mounting of the studs 18 permits them to turn when the truck train is rounding a curve. Thus the cable 4 is taut at all times and unaffected by variations in distance between relative positions of the vehicles.

Movement of the lever 6 back and forth turns the windlass drum to apply power to the cable, thus winding up a portion thereof and setting the brake shoes against the brake drums in the trailer wheels, the brake drum being held by the pedal pawl 7. Disengagement of the pawl by the foot of the driver releases the tension on the cable and permits the disengaging springs of the brake shoes to release them from the brake drums. That is, the recovery movement of the cable and windlass when the pawl is disengaged may be effected by the disengaging springs of the brake shoes, but if desired an additional spring 34 may be used for this purpose, and is conveniently interposed between the trailer frame 10 and the block 12.

When the trailer is uncoupled from the truck, the locking pin 23 preferably on the trailer is lifted out and the latch 22 swung aside to permit the stud to be freed from its bracket. The cable is unhooked from the block 12, and the device swung back upon the tail end of the truck.

Instead of spanning the variable space between the adjacent ends of the vehicles, the pivoted link structure may be disposed across any space which is variable with movement of the vehicle, as for example, across the variable length coupling the members 37 and 38 are relatively movable, a spring being interposed between them to absorb shock (Figure 6). Variation in the spacing of the vehicles is confined to the variation in the relative positions of the coupling members, and the distance between fixed points on these members is spanned by the link structure already explained. In this case the links 28 enclosing the pulley 31 between them are pivoted at their ends to brackets 41, one of which is fixed on each member of the coupling bar. The cable 4 is threaded over the guide pulleys 42 supported in brackets 41, and under the end pulleys 26 and middle pulley 31.

I claim:

1. A controlling device for the brakes on a trailer attached to a truck by an extensible coupling bar, comprising a cable operatively connected at one end to said trailer brakes, means on the truck for applying power to said cable, and means unaffected by relative movements of said truck and trailer for maintaining the cable taut.

2. A truck trailer brake controlling device comprising a cable operatively connected at one end of said trailer brakes, means on the truck for applying power to said cable, and means interposed between said truck and trailer and automatically adaptable to changes in the relative positions of and distance between said truck and trailer for maintaining the cable taut.

3. A truck trailer brake controlling device comprising a cable operatively connected at one end to said trailer brakes, means on the truck for applying power to said cable, and a series of spaced guides for said cable, the sum of the distances separating said guides being a constant.

4. A truck trailer brake controlling device comprising a cable operatively connected at one end to said trailer brakes, means on said truck for applying power to said cable, and a series of spaced guides for said cable spanning the variable distance between said truck and trailer, the sum of the distances between said guides being a constant.

5. A truck trailer brake controlling device comprising a cable operatively connected at one end to said trailer brakes, means on said truck for applying power to said cable, pivotally connected links pivotally interposed between said truck and trailer, and guides for said cable arranged on said links.

6. A truck trailer brake controlling device comprising a cable operatively connected at one end to said trailer brakes, means on said truck for applying power to said cable, pivotally connected links pivotally interposed between said truck and trailer and pulleys for guiding said cable disposed at the pivotal axes of said links.

7. A truck trailer brake controlling device comprising a stud pivotally mounted on the adjacent ends of both said truck and trailer, pivotally connected links pivotally connected to said studs, pulleys disposed on the axes of the pivotal connections between said links and between said links and said studs, a cable passing over said pulleys and connected operatively to said trailer brakes, and means on the truck for applying power to said cable.

8. A truck trailer brake controlling device comprising a stud pivotally mounted on the adjacent ends of both said truck and trailer, pivotally connected links pivotally connected to said studs, pulleys disposed on the axes of the pivotal connections between said links and between said links and said studs, means on the truck for applying power to said cable, and means for dismounting said studs and disconnecting said cable.

9. A truck trailer brake controlling device comprising a stud pivotally mounted on the adjacent ends of both said truck and trailer, pivotally connected links pivotally connected to said studs, pulleys disposed on the axes of the pivotal connections between said links and between said links and said studs, a pulley mounted above each stud and having its periphery substantially tangent to the pivotal axis thereof, a cable passing over said pulleys and connected operatively to said trailer brakes, and means on the truck for applying power to said cable.

10. A truck trailer brake controlling device comprising a stud pivotally mounted on the adjacent ends of both said truck and trailer, pivotally connected links pivotally connected to said studs, pulleys disposed on the axes of the pivotal connections between said links and between said links and said studs, a pulley mounted above each stud and having its periphery substantially tangent to the pivotal axis thereof, a cable passing over said pulleys and connected operatively to said trailer brakes, a windlass on said truck about which said cable is wound, and means for actuating and controlling the operation of said windlass.

11. An apparatus for transmitting motion between parts arranged to assume different spaced relations, on one of which parts there is a device to be moved, comprising a cable operatively connected at one end to said device, means on the other part for applying power to said cable, and means unaffected by the variable space relation of said parts for maintaining the cable taut.

12. An apparatus for transmitting motion between relatively longtudinally movable parts on one of which parts there is a device to be moved, comprising a cable operatively connected at one end to said device, means on the other part for applying power to said cable, and a series of spaced guides for said cable, the sum of the distances separating said guides being a constant.

13. An apparatus for transmitting motion between parts movable into different space relation, on one of which parts there is a device to be moved, comprising a cable operatively connected at one end to said device, means on the other part for applying power to said cable, pivotally connected links pivotally interposed between said movable parts, and guides for said cable arranged on said links.

In testimony whereof, I have hereunto set my hand.

GEORGE S. LANE.